United States Patent
Hiscock et al.

(10) Patent No.: US 7,673,034 B1
(45) Date of Patent: Mar. 2, 2010

(54) SELF SERVICE DATA INTERFACE

(75) Inventors: James S. Hiscock, Rockport, MA (US); Kiwon Chang, Needham, MA (US); Floyd Backes, Sharon, NH (US); Myles Kimmit, Shewsbury, MA (US)

(73) Assignee: 3Com Corporation, Marlborough, MA (US)

( * ) Notice: Subject to any disclaimer, the term of this patent is extended or adjusted under 35 U.S.C. 154(b) by 905 days.

(21) Appl. No.: 09/635,275

(22) Filed: Aug. 9, 2000

Related U.S. Application Data

(60) Provisional application No. 60/201,956, filed on May 5, 2000.

(51) Int. Cl.
*H04B 7/24* (2006.01)

(52) U.S. Cl. .................. 709/224; 709/226; 709/227; 455/419

(58) Field of Classification Search .............. 709/203, 709/204, 205, 217, 218, 224, 227, 228, 236, 709/206, 207, 223, 225, 208; 345/705, 709; 370/85.2, 95.1, 85.1; 707/3, 5; 455/456, 455/457, 419

See application file for complete search history.

(56) References Cited

U.S. PATENT DOCUMENTS

| | | | | |
|---|---|---|---|---|
| 5,459,727 A * | 10/1995 | Vannucci | .................... | 370/332 |
| 5,706,437 A * | 1/1998 | Kirchner et al. | ............. | 709/203 |
| 5,861,884 A * | 1/1999 | Fujioka | ...................... | 345/705 |
| 5,884,032 A * | 3/1999 | Bateman et al. | ............. | 709/204 |
| 6,115,737 A * | 9/2000 | Ely et al. | ..................... | 709/203 |
| 6,161,128 A * | 12/2000 | Smyk | ......................... | 709/205 |
| 6,167,258 A * | 12/2000 | Schmidt et al. | ............. | 455/419 |
| 6,169,943 B1 * | 1/2001 | Simon et al. | .................. | 701/29 |
| 6,340,977 B1 * | 1/2002 | Lui et al. | .................... | 345/709 |
| 6,477,565 B1 * | 11/2002 | Daswani et al. | ............. | 709/217 |
| 6,567,122 B1 * | 5/2003 | Anderson et al. | ......... | 348/211.3 |
| 6,694,338 B1 * | 2/2004 | Lindsay | ...................... | 707/203 |
| 6,757,521 B1 * | 6/2004 | Ying | ....................... | 455/67.11 |
| 6,757,739 B1 * | 6/2004 | Tomm et al. | ................ | 709/236 |
| 6,789,103 B1 * | 9/2004 | Kim et al. | ................... | 709/203 |
| 6,842,769 B1 * | 1/2005 | Kim et al. | ................... | 709/203 |
| 7,039,708 B1 * | 5/2006 | Knobl et al. | ................ | 709/227 |

* cited by examiner

*Primary Examiner*—Khanh Q Dinh

(57) ABSTRACT

A self service data interface includes communications logic providing communications with a personal data device and a data infrastructure, such as the computer resources in a department or building. A processor executes a data interface management process that communicates with the data infrastructure to obtain information about available data services, where the information includes information about how the available data services are accessed. The data interface management process also communicates with the personal data device to provide the information about the available data services to the user. The information is used by the personal data device to invoke the services directly via the self service data interface. The self service interface can have multiple communications links to the personal data device, such as a wire link and a wireless link. The information from the self service data interface can be provided as a hypertext page that is accessed and handled by a browser within the personal data device.

9 Claims, 2 Drawing Sheets

SELF SERVICE DATA INTERFACE

CROSS REFERENCE TO RELATED APPLICATIONS

This application claims priority under 35 U.S.C. §119(e) of Provisional Patent Application No. 60/201,956, filed May 5, 2000, entitled "Self Service Data Interface and Flexible Data Outlet".

STATEMENT REGARDING FEDERALLY SPONSORED RESEARCH OR DEVELOPMENT

Not Applicable

BACKGROUND OF THE INVENTION

The present invention is related to the field of communications between a personal data device such as a personal or hand-held computer and a data infrastructure such as a computer network in a company or building.

Increasingly, computer networks are being used by organizations in conducting their internal and external business activities. As the use of computer networks has grown, demand for skilled workers to operate and maintain the networks has increased significantly. Organizations are faced with significant costs of attracting and retaining necessary workers, and uncertainty whether the organizations' needs for skilled workers can be met at all. These costs and uncertainties may render it difficult or impossible for some organizations to make desired investments in computer networking technology. Such organizations may be placed at a competitive disadvantage, or may find that their very viability has become uncertain.

BRIEF SUMMARY OF THE INVENTION

In accordance with the present invention, a "self service" interface between users' personal data devices and a data infrastructure is disclosed that improves the openness and ease of use of the data infrastructure, thereby enabling wider use of information technology without the high costs and uncertainties described above.

The self service data interface includes communications logic providing communications with a personal data device and with a data infrastructure, such as the set of computer resources attached to a network in a department or building. A processor executes a data interface management process that communicates with the data infrastructure via the communications logic to obtain information about available data services, where the information includes information about how the available data services are accessed. The data interface management process also communicates with the personal data device to provide the information about the available data services to the user. The information can then be used by the personal data device to invoke the services directly via the self service data interface.

one particular advantage of the interface is the ability to monitor status of the data infrastructure as well as the status of the communications with the user. This enables a user to diagnose and correct some types of operational problems without the involvement of operations personnel. Also, information about the status of system problems can be provided to users without requiring the involvement of system support personnel.

Other features of the disclosed self service interface include the use of multiple communications links to the user, including one or more wire-based links such as Ethernet links and/or one or more wireless data links. This configuration provides desirable redundancy in the communications with the user, such that a problem on one link can be diagnosed using the other link, for example. As another feature, the information from the self service data interface may be provided in the form of a hypertext page that is easily accessed and handled by a standard browser within the personal data device. Pages may include hot links to enhance ease of use.

Other aspects, features, and advantages of the present invention are disclosed in the detailed description that follows.

DETAILED DESCRIPTION OF THE INVENTION

The disclosure of Provisional Patent Application No. 60/201,956, filed May 5, 2000, entitled "Self Service Data Interface and Flexible Data Outlet", is incorporated by reference herein.

Figure 1:
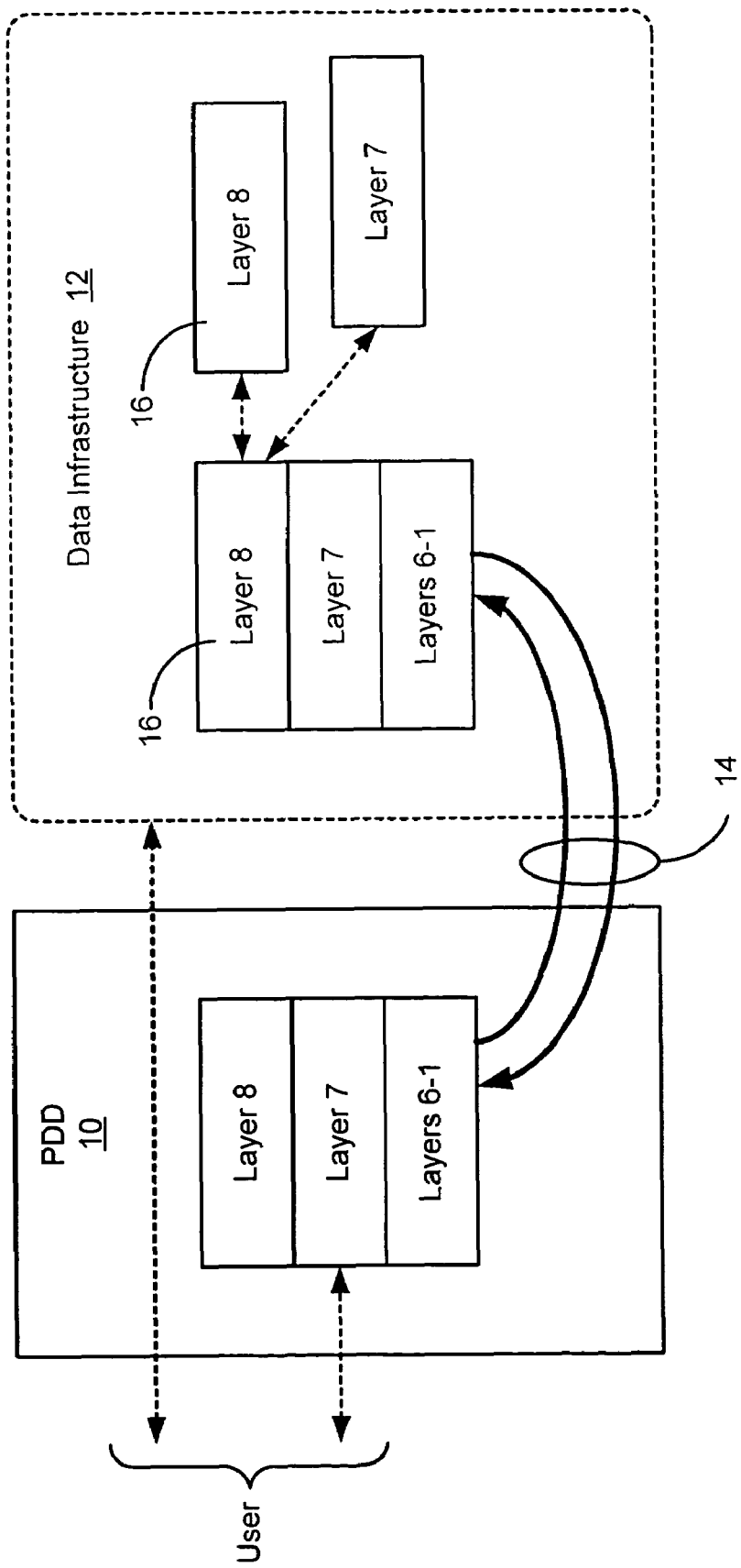
FIG. 1 is a diagram depicting a hierarchical scheme for communications between a user and a data infrastructure in accordance with the present invention.

In FIG. 1, a user's personal data device (PDD) 10 is communicatively coupled to a data infrastructure 12. The PDD 10 may be a desktop computer, a portable computer, a palm-top computer or similar device that provides information services to a user. The data infrastructure 12 is a domain of applications programs and other data services. For example, the data infrastructure 12 may extend throughout an organization such as a company or a department, and/or may extend throughout a given physical space such as a set of offices, an entire building or a campus of buildings. Properly authenticated users within the data infrastructure have access to some or all of the applications programs and data services available therein.

FIG. 1 shows communications between the PDD 10 and the data infrastructure 12 using the well known multi-layer OSI model. According to this model, layer 7 is known as the "Application" layer, and is the highest layer in terms of abstracting the available communications functionality. Examples of layer-7 functionality include electronic mail (e-mail) and Internet browsers. Layers 6 through 1 in the OSI model are successively less abstract, such that at the lowest layer, layer 1 or the "Physical" (PHY) layer, the service provided is the transmission of a raw bit stream over a physical communications medium such as a copper cable. The multiple levels of communication between the PDD 10 and the data infrastructure 12 are shown in FIG. 1 by arrows 14.

The data infrastructure 12 includes "layer 8" entities 16 operating above layer 7. The layer 8 entities 16 provide services referred to herein as "User Presentation" services, so named for their functional analogousness to the services of the (Application) Presentation layer 6. Just as layer 6 eases the interaction between applications at layer 7 and session services at layer 5, layer 8 eases the interaction between users and layer 7 applications and services.

The layer 8 entities 16 are responsible for gathering, maintaining, and providing information about layer 7 applications and services available in the data infrastructure 12. A user accesses this information using a specified layer 7 application, such as a browser, in the PDD 10. The information provided at layer 8 may be in the form of Web pages, for example, containing the information about the applications and services available in the data infrastructure 12. A wide variety of information may be maintained, including for example the names of applications and services that are available, the manner in which these items are accessed, and their respective costs.

A layer 8 entity 16 gathers pertinent information by communicating with other layer 8 entities and layer 7 entities within the data infrastructure 12. The layer 8 entity 16 then formats the information in a manner making it accessible to the user. In one embodiment, the information can be formatted as a page of hypertext using the well known Hypertext Markup Language (HTML). A more recently developed language known as Extensible Markup Language (XML) can be used to provide even greater flexibility in the definition and formatting of the layer 8 information. In either case, Layer 7 entities can be identified using hot links, for example. Preferably, a structured naming scheme is used to identify resources. Thus, for example, the links for print services in a facility of a company may be of the form <company name>.<location>.<print service identifier>, while the links for file services at the same location are of the form <company name>.<location>.<file service identifier>. Such a naming plan enhances the ease of use of the system, by enabling experienced users to fairly easily locate system resources.

A layer 8 entity 16 can interact with a user in a passive manner, i.e., by responding to the user's initiation of actions. For example, a layer 8 entity 16 may respond to a user's request for information about available e-mail services by searching the data infrastructure for such information, formatting the information and sending the formatted information to the PDD 10. A layer 8 entity 16 can also function in a more active manner. For example, a layer 8 entity 16 can present the user with a dialog box to query the user regarding the types of information and services that the user finds of interest or is likely to use. Additionally, the user may be asked whether it is desirable to have information presented automatically, for example at some predefined regular interval. In such cases, the layer 8 entity 16 tailors its activity to the user's desires. In particular, the layer 8 entity 16 monitors the layer 8 and layer 7 entities in the data infrastructure 12 to detect changes in the information of interest, and then notifies the user of these changes. For example, the layer 8 entity may inform the user whenever a new e-mail service becomes available, or an existing e-mail service becomes unavailable.

Figure 2:
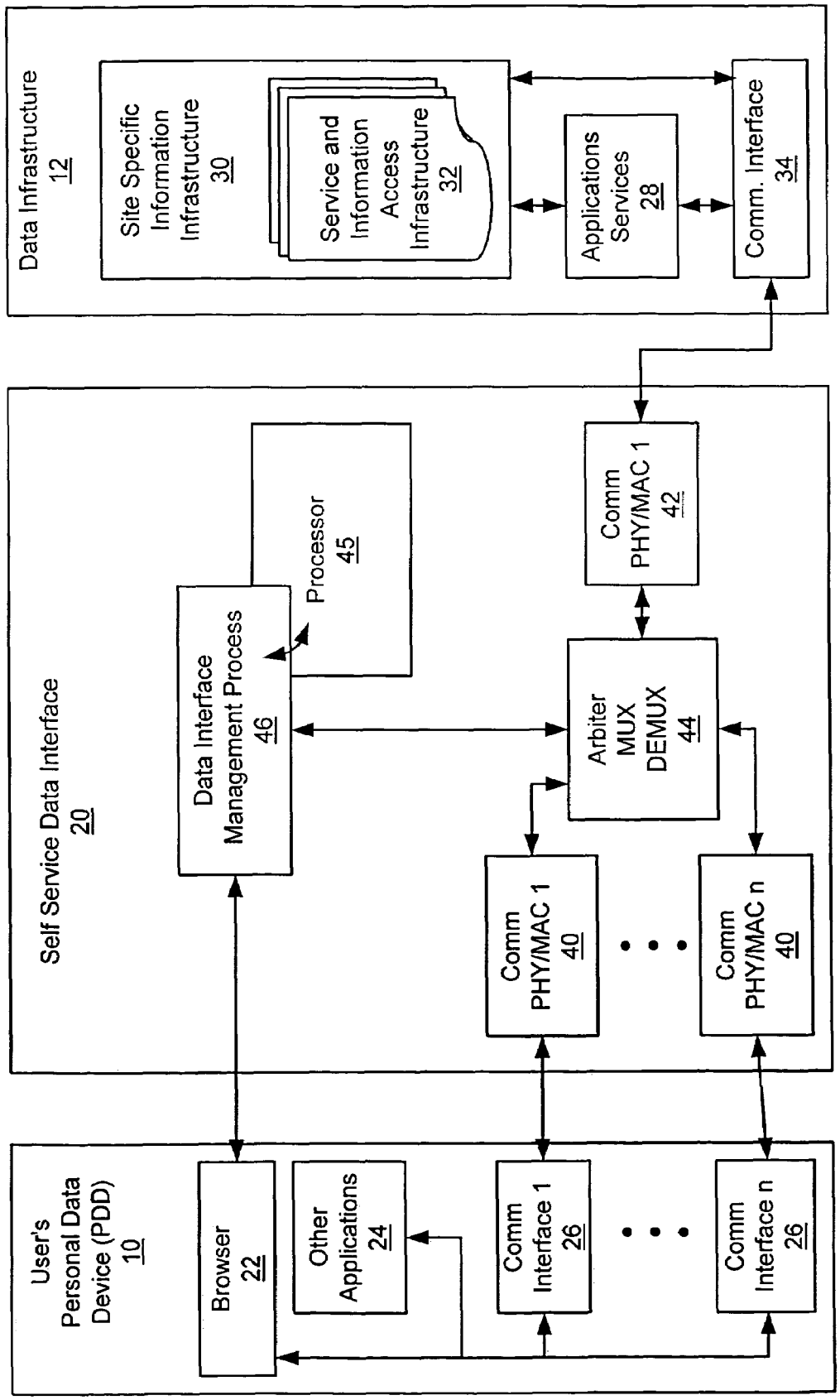
FIG. 2 is a block diagram of a communications system incorporating the communications scheme of FIG. 1.

FIG. 2 shows a configuration of functional elements implementing the system shown in FIG. 1. In FIG. 2, a separate "self service data interface" 20 is shown between the PDD 10 and the data infrastructure 12 for ease of description. The self service data interface 20 can be realized as an item apart from the data infrastructure 12, as shown in FIG. 2, or it can be part of the data infrastructure 12. As a separate item, the self service data interface 20 may reside in a unit physically close to the PDD 10, such as within a small enclosure forming part of a wall jack to which the PDD 12 can be connected. Alternatively, it may be useful to incorporate the functionality of the self service data interface 20 into a network switch, multiplexer, or similar device to which the PDD 10 is coupled within the data infrastructure 12.

As shown, the PDD 10 includes a browser 22 or similar application for obtaining layer 8 information. The PDD 10 also includes other applications programs 24, such as e-mail, calendar, word processing, etc. The PDD 10 also includes one or more communications interfaces 26. Preferably these include at least one interface to a high-speed wire link, such as an Ethernet link, and at least one wireless data interface. The wireless interface may advantageously employ an emerging wireless standard referred to as "Bluetooth". One major feature of the Bluetooth standard is its specification of both point-to-point and point-to-multipoint connections, in which up to seven slave devices can communicate with a single master device. Additionally, several such master-slave collections can be linked together to form larger networks. Additionally, the Bluetooth standard specifies two power levels, one suitable for a relatively small area such as a room, and another suitable for a larger area such as a house or a suite of offices, and also includes security features. Although not shown in FIG. 2, the PDD 10 includes the necessary protocol stacks for implementing layers 2-6 of the OSI communications model between the communications interfaces 26 and the applications 22 and 24.

The data infrastructure 12 includes a variety of applications and services 28 that are potentially available to a user of the PDD 10. Information about these applications and services are maintained in a site-specific information infrastructure 30. The information infrastructure 30 includes various information about the data infrastructure 12 that may be useful for a user. This information includes sets of instructions 32 for accessing the associated services, status information about the network and the applications, etc. The data infrastructure 12 also includes one or more communications interfaces 34 for communicating with the self service data interface 20 and the PDD 10.

The self service data interface 20 includes user-side communications interfaces 40 coupled to infrastructure-side communications interface(s) 42 by logic 44 that performs arbitration and multiplexing/demultiplexing functions. A data interface management process 46, which may be executed for example on a general-purpose microprocessor 45, is coupled to the logic 44 and is capable of communicating with both the PDD 10 and the data infrastructure 12. The data interface management process 46 monitors the respective statuses of the user-side communications interfaces 40 and the data infrastructure 12, including service access, availability and cost information contained therein. This information is stored in a location within the data infrastructure 12 that is well known to the data interface management process 46. For example, the data interface management process 46 may be configured with pointers to the information, or alternatively may contain a routine that is capable of locating the information. This status information is provided to the PDD 10 where it is displayed or otherwise made available to the user.

One particular function performed by the data interface management process 46 is to track error indications at the communications interfaces 40 and/or 42 and determine whether any detected errors are correctable by the user. For such errors, a listing of corrective action steps is supplied to the user via one of the interfaces 40, if possible. For example, it may be that an Ethernet cable between the PDD and the self service data interface 20 is not properly connected. If there is a wireless link established between the PDD and the self service data interface 20, then this link is used to provide instructions to the user for correctly installing the cable. For errors that are not correctable by the user, the user can be given information about the error, the system process by which the error is to be corrected, and the status of the process. For example, the user may be informed about the date and time the error was detected, whether an operator or maintenance person has been notified, the expected time by which the error should be fixed, and perhaps a telephone number or link to a person who can provide more information if desired.

A self service data interface and related components have been described. It will be apparent to those skilled in the art that modifications to and variations of the above-described technique are possible without departing from the inventive concepts disclosed herein. Accordingly, the invention should be viewed as extending to the full scope and spirit of the appended claims.

What is claimed is:

1. A wall-mountable data interface, comprising:

an enclosure having at least one jack, the enclosure being configured for mounting within a wall cavity such that, after the enclosure is mounted within the wall cavity, the at least one jack is accessible from outside the wall:

a user-side communication interface within the enclosure for connection to a personal data device over at least one wired communication connection via the at least one jack and for connection to the personal data device over at least one wireless communication connection;

an infrastructure-side communication interface within the enclosure for connection to a plurality of computer resources, the infrastructure-side communication interface being communicably coupled to the user-side communication interface, such that the personal data device can communicate through the user-side communication interface and the infrastructure-side communication interface to at least one of the plurality of computer resources; and a data interface management processor within the enclosure and coupled to the user-side communication interface and the infrastructure-side communication interface and operative to provide information to the personal data device (a) about at least one of the wired and wireless communication connections between the personal data device and the user-side communication interface, (b) about a communication connection between the infrastructure-side communication interface and at least one of the plurality of computer resources, and (c) about services available from the plurality of computer resources, said information provided in a form handled by the personal data device to communicatively inform said user sufficiently to enable said user to diagnose said communication connections and services.

2. The wall-mountable data interface of claim 1, wherein the information about the at least one of the wired and wireless communication connections comprises status information about the wired communication connection and the wireless communication connection between the personal communication device and the user-side communications interface.

3. The wall-mountable data interface of claim 1, wherein the information about the at least one of the wired and wireless communication connects comprises at least one suggested corrective action that can be taken by a user of the personal data device to correct a problem detected by the data interface management processor in at least one the wired and wireless communication connections.

4. The wall-mountable data interface of claim 1, wherein the information about the at least one of the wired and wireless communication connections comprises information about at least one error in at least one of the wired and wireless communication connections.

5. The wall-mountable data interface of claim 1, wherein the information about the at least one of the wired and wireless communication connections comprises information about at least one corrective action that has been taken to correct a problem in at least one of the wired and wireless communication connections.

6. The wall-mountable data interface of claim 1, wherein the information about the communication connection between the infrastructure-side communication interface and the at least one computer resource comprises status information about the communication connection between the infrastructure-side communication interface and the at least one computer resource.

7. The wall-mountable data interface of claim 1, wherein the information about the communication connection between the infrastructure-side communication interface and the at least one computer resource comprises information about at least one error in the communication connection between the infrastructure-side communication interface and the at least one computer resource.

8. The wall-mountable data interface of claim 6, wherein the information about the communication connection between the infrastructure-side communication interface and the at least one computer resource comprises information about at least one corrective action that has been taken to correct a problem in the communication connection between the infrastructure-side communication interface and the at least one computer resource.

9. The wall-mountable data interface of claim 6, wherein the information about the communication connection between the infrastructure-side communication interface and the at least one computer resource comprises an estimated time by which an error in the communication connection between the infrastructure-side communication interface and the at least one computer resource will be corrected.

* * * * *